United States Patent
Dai et al.

(10) Patent No.: US 7,581,214 B2
(45) Date of Patent: Aug. 25, 2009

(54) LIVE SET TRANSMISSION IN PIPELINING APPLICATIONS

(75) Inventors: Jinquan Dai, Shanghai (CN); Luddy Harrison, Chestnut, MA (US); Cotton Seed, Cambridge, MA (US); Bo Huang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1197 days.

(21) Appl. No.: 10/824,586

(22) Filed: Apr. 15, 2004

(65) Prior Publication Data

US 2005/0235276 A1    Oct. 20, 2005

(51) Int. Cl.
    G06F 9/45    (2006.01)
(52) U.S. Cl. ..................................... 717/159
(58) Field of Classification Search ................ 717/140, 717/159
    See application file for complete search history.

(56) References Cited

U.S. PATENT DOCUMENTS

| 2002/0099756 A1* | 7/2002 | Catthoor et al. ............. 709/102 |
| 2003/0126186 A1* | 7/2003 | Rodgers et al. ............. 709/107 |
| 2003/0177335 A1* | 9/2003 | Luick ......................... 711/210 |

OTHER PUBLICATIONS

Callahan et al., Adapting Software Pipelining for Reconfigurable Computing, ACM, Nov. 2000, 1-8.*

* cited by examiner

*Primary Examiner*—John Chavis
(74) *Attorney, Agent, or Firm*—Venable LLP; James R. Burdett; Christopher Ma (57) ABSTRACT

A program may be partitioned into at least two stages, where at least one of the stages comprises more than one parallel thread. Data required by each of the stages, which data is defined in a previous stage may be identified. Transmission of the required data between consecutive stages may then be provided for.

22 Claims, 12 Drawing Sheets

LIVE SET TRANSMISSION IN PIPELINING APPLICATIONS

BACKGROUND OF THE INVENTION

Some processors, for example, some network processors, may include highly parallel architectures. Accordingly, such processors may be well-suited for use with applications that take advantage of these parallel architectures. For example, a network application for packet processing may include, for example, receiving a packet, routing table look-up, and enqueueing of the packet. Such an application may be parallelized through pipelining and multi-threading transformations.

In implementing such a transformation, the data may typically be transmitted from stage to stage via a global resource ("pipe", which may refer to one or more various data transmission channels). However, not all data transmitted from stage to stage may be necessary. As a result, unnecessary overhead may be incurred in transmitting data that are not needed.

BRIEF DESCRIPTION OF THE DRAWINGS

Various embodiments of the invention will now be described in connection with the associated drawings, in which.

DETAILED DESCRIPTION OF THE INVENTION

Embodiments of the invention are discussed in detail below. While specific exemplary embodiments are discussed, it should be understood that this is done for illustration purposes only. A person skilled in the relevant art will recognize that other components and configurations can be used without parting from the spirit and scope of the invention.

Components/terminology used herein for one or more embodiments of the invention are described below:

In some embodiments, "computer" may refer to any apparatus that is capable of accepting a structured input, processing the structured input according to prescribed rules, and producing results of the processing as output. Examples of a computer may include: a computer; a general purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer may have a single processor or multiple processors, which may operate in parallel and/or not in parallel. A computer may also refer to two or more computers connected together via a network for transmitting or receiving information between the computers. An example of such a computer may include a distributed computer system for processing information via computers linked by a network.

In some embodiments, a "machine-accessible medium" may refer to any storage device used for storing data accessible by a computer. Examples of a machine-accessible medium may include: a magnetic hard disk; a floppy disk; an optical disk, such as a CD-ROM or a DVD; a magnetic tape; and memory chip.

In some embodiments, "software" may refer to prescribed rules to operate a computer. Examples of software may include: code segments; instructions; computer programs; and programmed logic.

In some embodiments, a "computer system" may refer to a system having a computer, where the computer may comprise a machine-accessible medium embodying software to operate the computer.

Figure 1A:
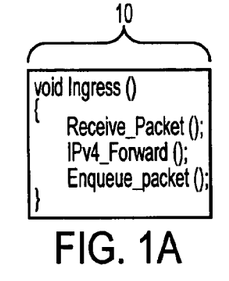
FIGS. 1A and 1B show a conceptual example of how an application may be handled according to embodiments of the invention.
Figure 1B:
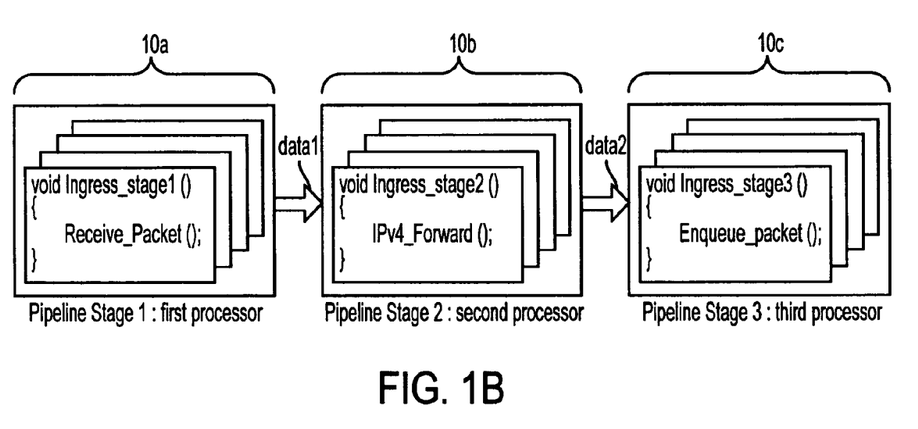

FIG. 1A shows an example of an application 10 that may be pipelined and parallelized as in embodiments of the present invention. This particular example depicts an exemplary ingress operation for a networking protocol. In this application, three operations may be executed sequentially for each data packet. However, the nature of these operations may be such that several packets may be processed simultaneously, if the hardware permits. For example, if the computing platform includes multiple processors, each processor, in turn, comprising multiple sub-processors that may provide parallel operations, this computing platform may be suited to such operations; however, other computing platforms may also be suitable, and the invention is not to be thusly limited. In such a case, the application may be pipelined, for example, in three stages, 10a, 10b, and 10c, as shown in FIG. 1B, in which each stage may provide for execution of one of the three operations on multiple packets. In carrying this out, necessary data may be passed from each stage to the next succeeding stage.

Figure 2A:
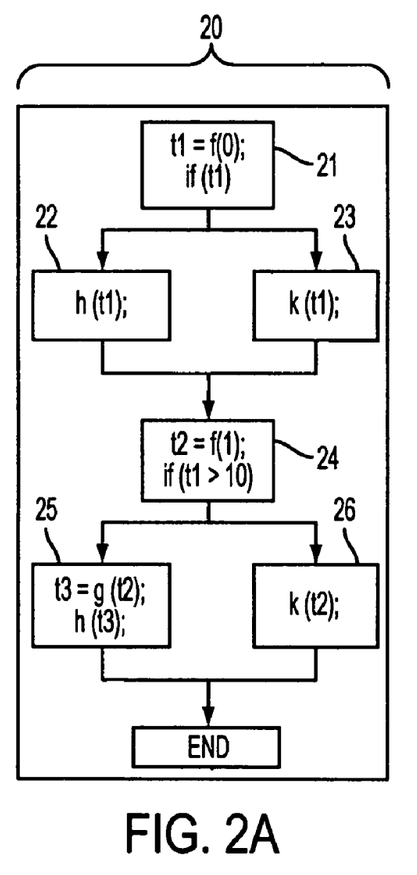
FIGS. 2A and 2B show an example of an application and how it may be transformed according to embodiments of the invention.
Figure 2B:
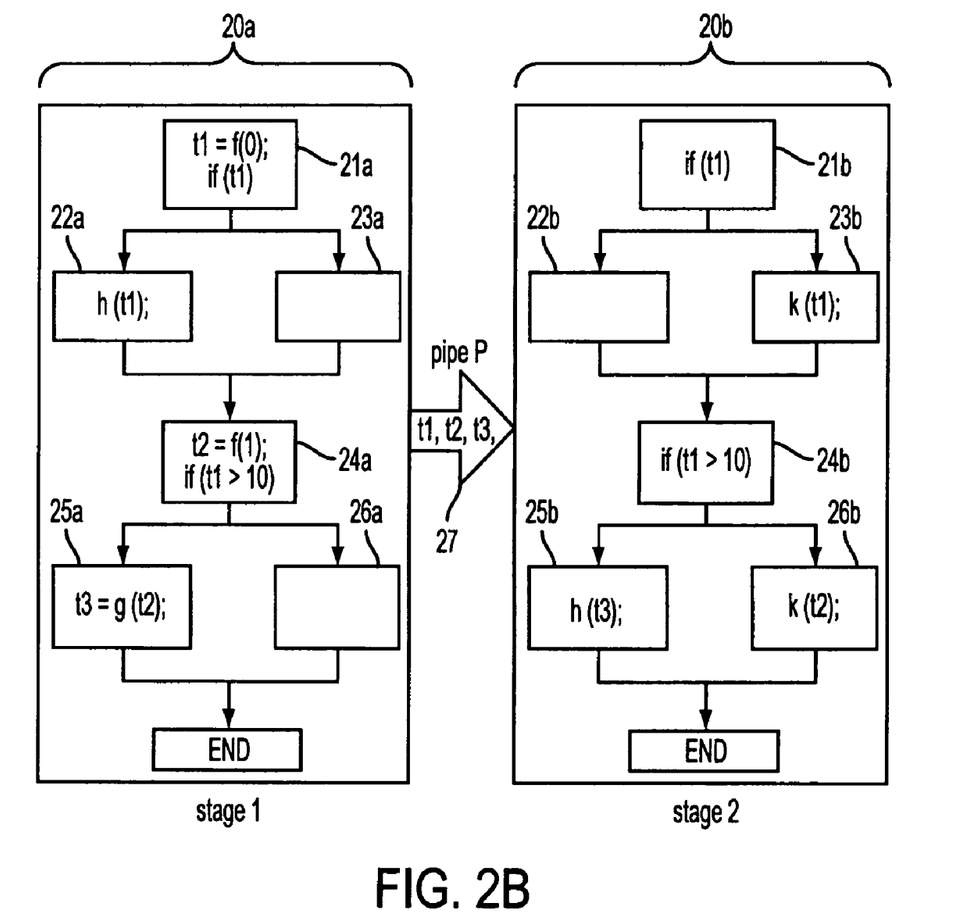

FIGS. 2A and 2B depict a more general example of the pipelining and parallelizing of a program, according to embodiments of the invention. FIG. 2A shows a control flow graph (CFG) of an application program 20. In block 21, a variable t1 may be computed, followed by a condition based on t1. Depending on the outcome of the condition, the application may continue with either block 22 or block 23, in each of which a function of the variable t1 may be computed. In block 24, another variable, t2, may be defined, and a further condition (also based on t1) may be executed. Depending upon the outcome of the condition in block 24, the application may continue with either block 25, where another variable, t3, may be defined and a function of t3 may be computed, or with block 26, where a function of t2 may be computed.

In FIG. 2B, the application 20 of FIG. 2A has been partitioned into two stages, 20a and 20b, to be referred to as stage 1 and stage 2. In particular, in stage 1 (20a), block 21a may contain the same operations as for block 21 of application 20. If the condition of block 21a comes out such that the left branch, block 22a, is chosen, block 22a may include the same operation as in block 22 of application 20. Otherwise, block 23a may contain no operation. Block 24a may be identical to block 24, and the condition may determine whether stage 1 continues with block 25a or block 26a. If it continues with block 25a, the variable t3 may be defined, as in block 25. If block 26a is chosen, then no operation may be executed. From stage 1 (20a), the three data defined, variables t1, t2, and t3, may be passed to stage 2 (20b) via a pipe 27.

In stage 2 (20b) of FIG. 2B, block 21b may execute only the condition of block 21; there may be no need to re-compute t1 because it may have been obtained from stage 1. If the condition determines that stage 2 should continue with block 22b, no operation may be executed. This is consistent with the partitioning, as the function defined in block 22 may be carried out in block 22a of stage 1. However, if the condition determines that stage 2 should continue with block 23b, the same operation as shown in block 23 of application 20 may be executed. Then, stage 2 may continue to block 24b, where only the condition may be executed, to determine if stage 2 may continue with block 25b or with block 26b. Again, because t2 may have already been defined, there may be no need to re-compute it. If stage 2 continues with block 25b, the function of t3 shown in block 25 of application 20 may be executed (again, t3 may have been previously defined). On the other hand, if stage 2 continues with block 26b, the function of t2 shown in block 26 of application 20 may be executed.

The transmission of only a "live set" of data, that is, a set of data that are "alive" at a boundary between stages of a partition of the application (created by pipelining) may serve to improve efficiency of execution of the pipelined and parallelized application. Data that are "alive" are those data already determined and to be used in a subsequent stage (for example, if a variable is defined in a first stage, not used in a second stage, used in a third stage, and not used subsequently, it would be alive at the boundaries between the first and second stages and the second and third stages, but not at the boundary between the third and fourth stages). In the example of FIG. 2B, all three data, t1, t2, and t3, are alive at the boundary between stage 1 (20a) and stage 2 (20b).

Figure 3A:
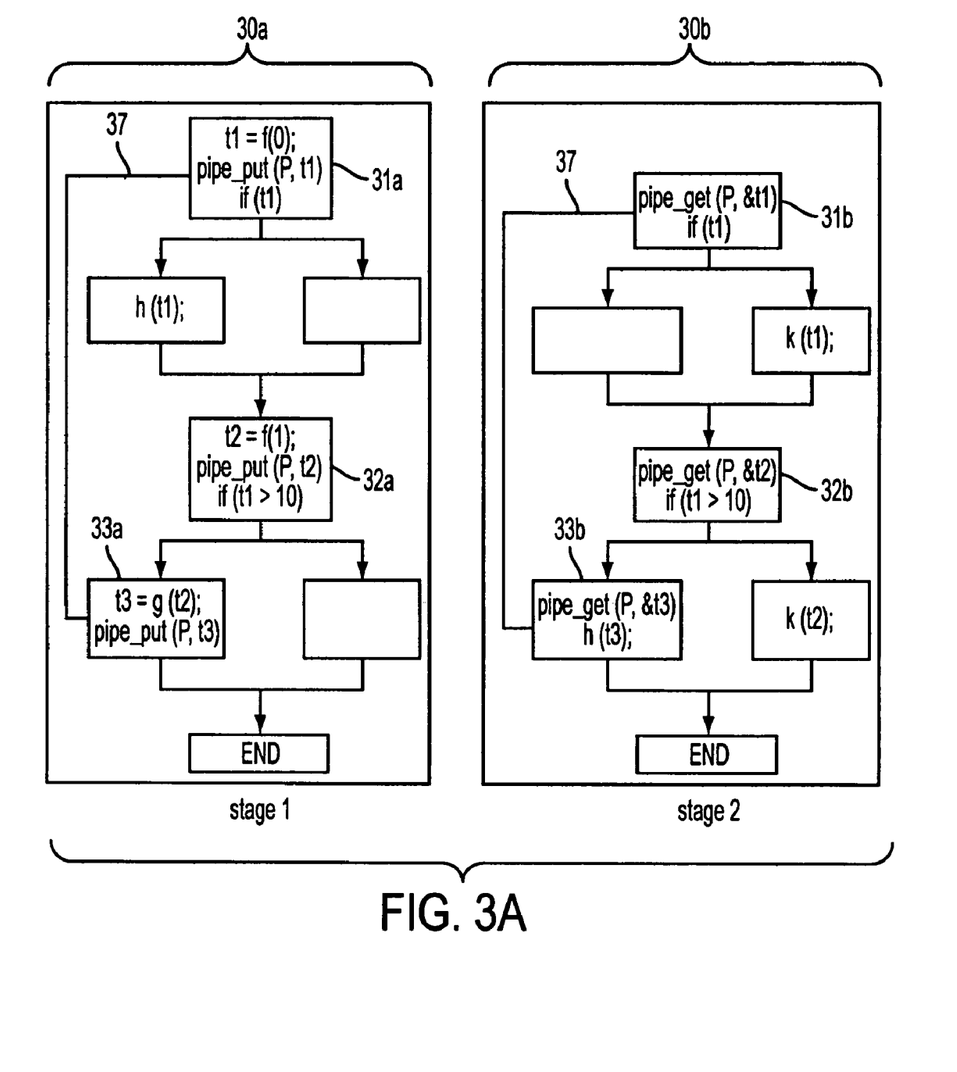
FIGS. 3A, 3B, and 3C use the example of FIGS. 2A and 2B to show different ways of transmitting data between stages, according to various embodiments of the invention.
Figure 3B:
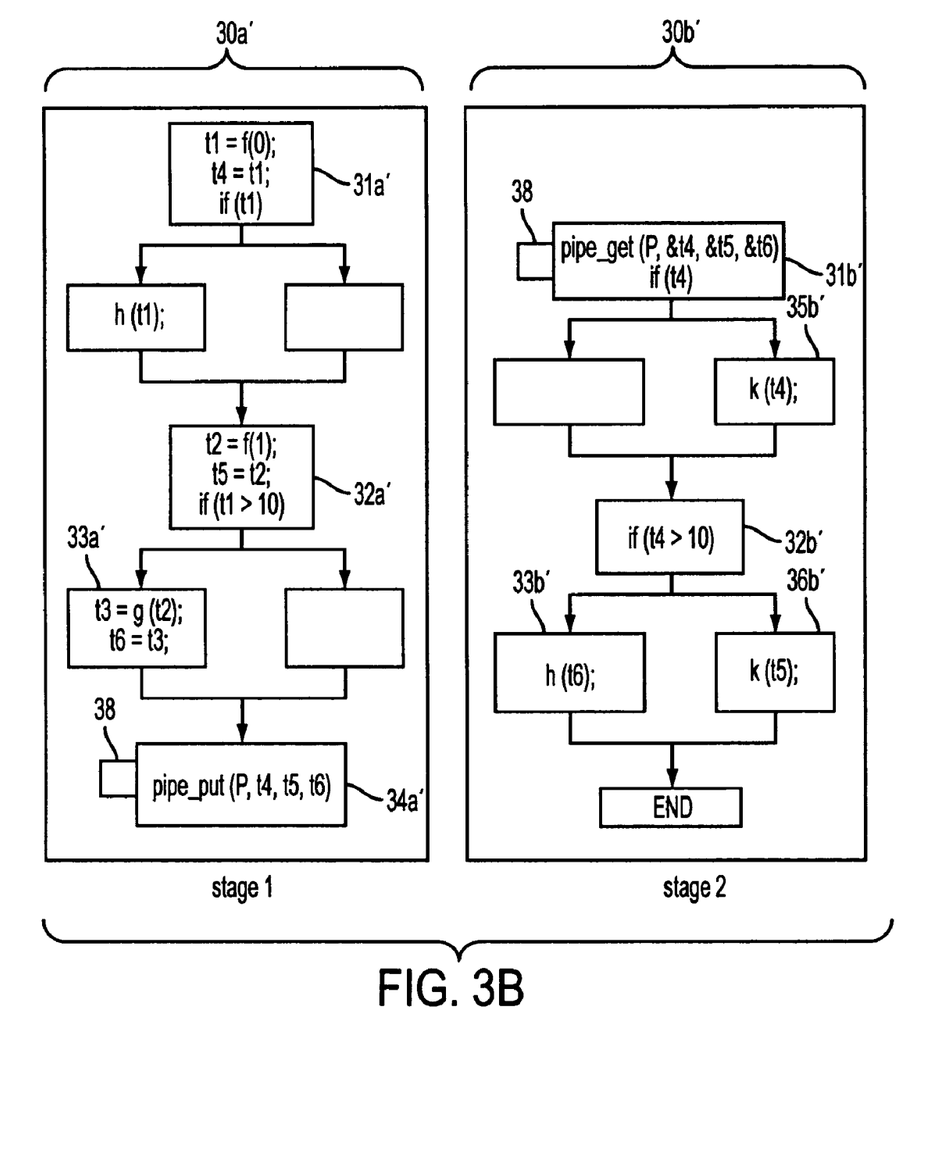
Figure 3C:
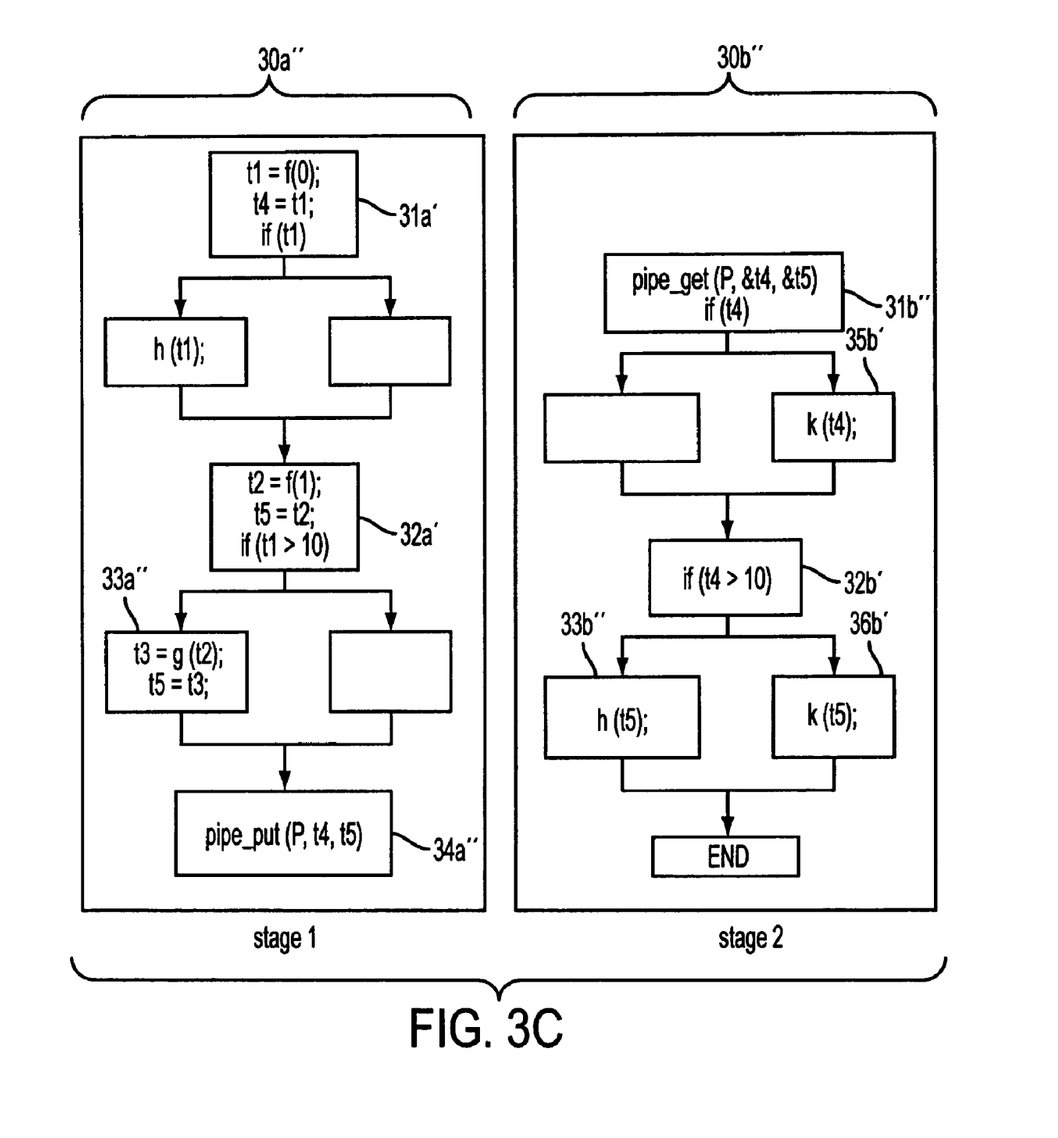

FIGS. 3A-3C show three ways, according to various embodiments of the invention, in which the live set of data may be transmitted between two stages of a pipeline. FIGS. 3A-3C use the example shown in FIGS. 2A and 2B as an illustration of the various embodiments of the invention.

FIG. 3A shows an example of what may be termed "conditional live set transmission." In this embodiment, each datum of the live set may be conditionally transmitted. That is, using the example of FIG. 3A, if the datum is needed in a block of stage 2 (30b), that datum may be placed into the pipe at a point following its definition in stage 1 (30a) and may be obtained from the pipe at a corresponding point in stage 2 (30b). Only data that are needed in any subsequent stage may be transmitted. In particular, in stage 1 (30a), in blocks 31a, 32a, and 33a, respectively, the "pipe_put" instructions may place the data, t1, t2, and t3, respectively, into the pipe, while in stage 2 (30b), in blocks 31b, 32b, and 33b, respectively, the "pipe_get" instructions may obtain the data from the pipe.

FIG. 3B shows an example of what may be termed "naively unified live set transmission." In this embodiment of the invention, all data may be transmitted to the pipe at a single point of each stage and may be obtained from the pipe at a single point of each stage. This technique may be advantageous over the embodiment of FIG. 3A in that the synchronization required for the type of data transmission shown in FIG. 3B may be less than that required for the type of data transmission shown in FIG. 3A, due to the fact that, contrasting the lines 37 in FIG. 3A and 38 in FIG. 3B, the critical section of the application centered around pipe operations may be significantly larger in the embodiment of FIG. 3A than in the embodiment of FIG. 3B. As a result, efficiency may be improved by using the embodiment of FIG. 3B.

In FIG. 3B, as each datum is determined, that datum may be duplicated in a new datum that may be used for transmission. In FIG. 3B, this may be seen in the presence in stage 1 (30a') of the definitions of t4=t1, t5=t2, and t6=t3 in blocks 31a', 32a', and 33a', respectively. Then, at the end of a stage, all of the data may be placed into the pipeline together; in FIG. 3B, this may be seen in the pipe_put instruction in block 34a' of stage 1 (30a'). At the beginning of each subsequent stage, as demonstrated by block 31b' of stage 2 (39b'), all of the data may be retrieved from the pipe together (noting the pipe_get instruction). As reflected in blocks 32b', 33b', 35b', and 36b' of stage 2 (30b'), the instructions that may be executed in subsequent stages may be adapted to operate on the new data (t4, t5, and t6) instead of on the original data (t1, t2, and t3).

While, as discussed above, the embodiment of FIG. 3B may provide an improvement over the embodiment of FIG. 3A, the embodiment of FIG. 3C may, in turn, provide improvement over the embodiment of FIG. 3B. The naïve unified live set transmission of FIG. 3B may transmit more data than necessary because, due to the parallelization, objects that appear to both be part of the live set may, in fact, not both be alive simultaneously. For example, returning to FIGS. 2A and 2B, one may notice that, as a result of the condition executed in block 24, either a function of t3 may need to be computed (block 25) or a function of t2 may need to be computed (block 26). Noting that t3 may be computed in stage 1 (20a), if needed, it may not be necessary to pass both t2 and t3 to stage 2 (20b); that is, t2 and t3 may not both be alive at the boundary between stage 1 (20a) and stage 2 (20b), even though, at first glance, they may both appear to be alive. In the embodiment of FIG. 3C, such redundancy may be eliminated, thus taking advantage of the parallelism.

The embodiment of FIG. 3C may take advantage of the above-described situation by defining new data, t4 and t5, in blocks 31a', 32a', and 33a" of stage 1 (30a"), which may be placed the pipe at block 34a". The values of t4 and t5 may be obtained from the pipe in block 31b" of stage 2 (30b"). Similarly to the embodiment of FIG. 3B, blocks 31b", 32b', 33b", 35b', and 36b' of stage 2 (30b") may be adapted to operate on the new data, in this case, t4 and t5. The difference between this embodiment and the embodiment of FIG. 3B is that, instead of defining t4 32 t1, t5=t2, and t6=t3, this embodiment may define t4=t1 and t5=either t2 or t3. That is, the embodiment of FIG. 3C may take advantage of the condition of blocks 32a' and 32b' to determine whether the value of t2 or the value of t3 may be needed in stage 2 (30b"). If the condition comes out one way, t3 may be computed in block 33a" and t5 may be set equal to t3; then, in stage 2 (30b"), in block 33b", h(t5) may be computed, and there may be no need for t2. On the other hand, if the condition comes out the other way, t5, which was set equal to t2 in block 32a', is used in block 36b' to compute k(t5), and there may be no need for t3. As a result, there may be less data to transmit from stage to stage.

Figure 4:
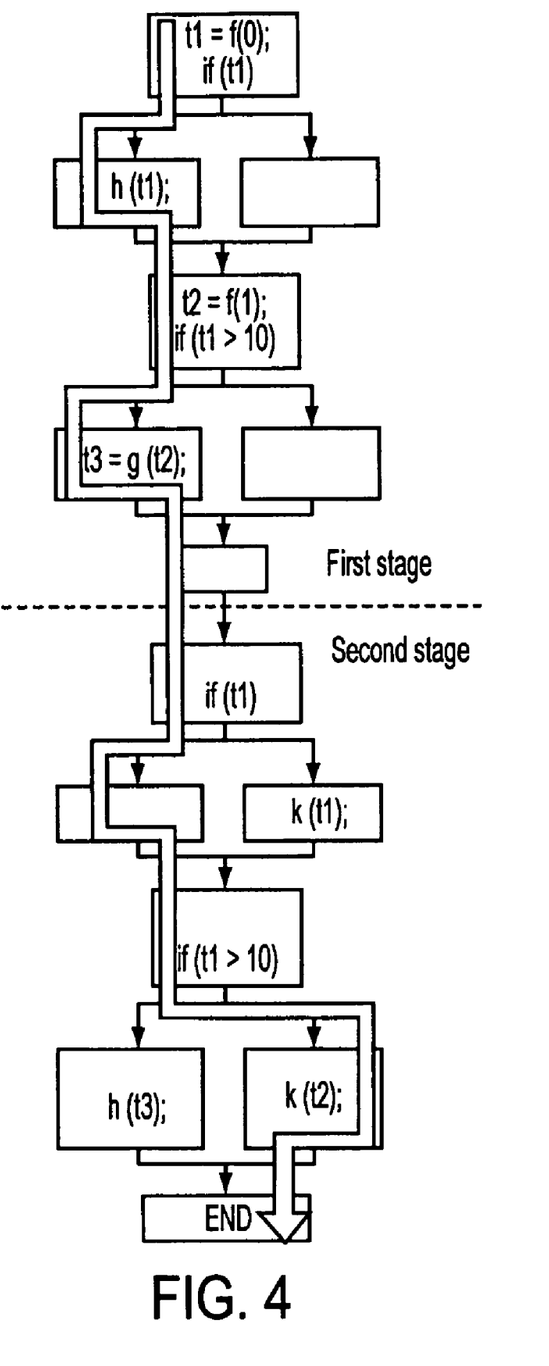
FIG. 4 shows an example of traversal of a concatenated control flow graph according to some embodiments of the invention.

The criterion for determining whether or not two data may be used in subsequent stages of a pipelined, parallelized application, as discussed above, may be whether the two data are simultaneously alive. In such a case, the data are said to "interfere" with each other. That is, if two data interfere with each other, they may need to both be passed on through the data pipe. FIG. 4 shows a concatenated CFG of the pipelined, parallelized stages of FIG. 2B. One way of determining whether or not there may be interference between data may be to traverse all possible paths of the concatenated CFG of FIG. 4. However, a naïve traversal of the concatenated CFG of FIG. 4 may result in paths that may never occur, such as that shown by the heavy arrow in FIG. 4. The result of this may be that data that in reality may not interfere may be found to interfere.

Figure 5:
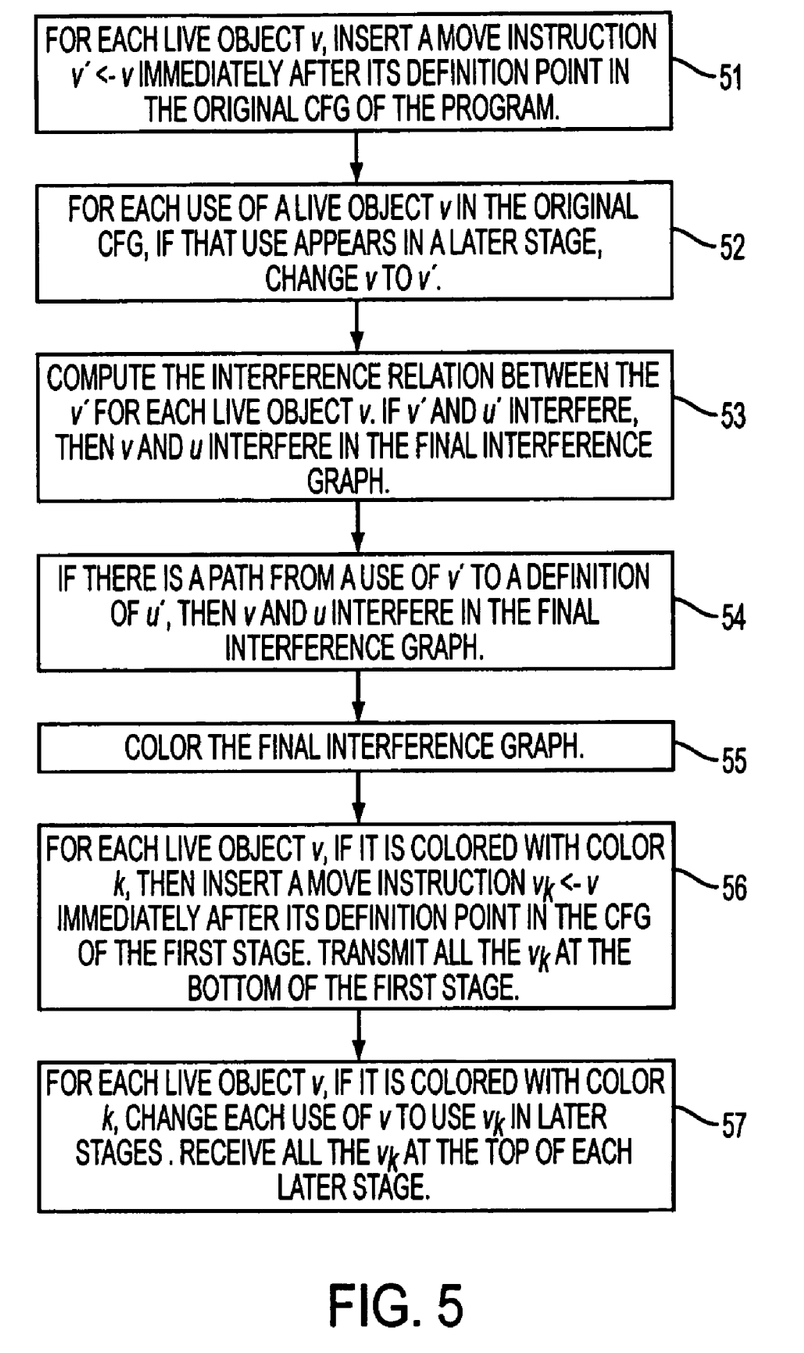
FIG. 5 depicts a flowchart showing a process according to an embodiment of the invention.
Figure 6:
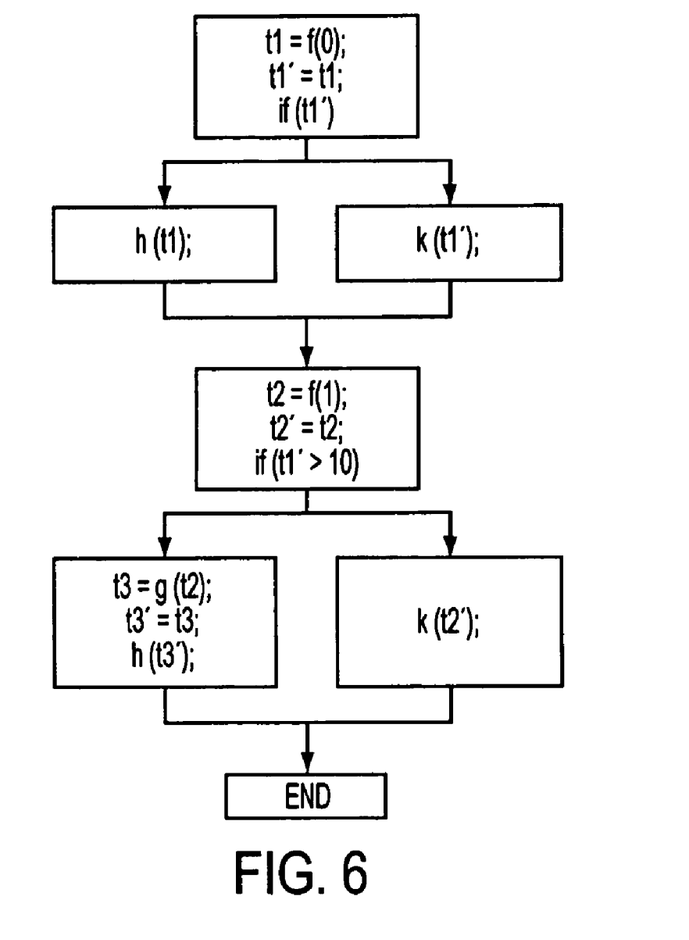
FIG. 6 shows a control flow graph that may be generated as an intermediate product of the flowchart of FIG. 5, according to an embodiment of the invention.

To solve this problem, embodiments of the invention may use a procedure illustrated by the flowchart of FIG. 5. Blocks 51 and 52 form what may be considered to be a first component of the procedure of FIG. 5. In block 51, for each live object, v, a new object v' may be defined immediately following the point in the CFG at which v is first defined. Then, in block 52, each of the newly-defined object (e.g., v') may substituted for the occurrences of the original objects (e.g., v), in subsequent stages. Using the example of FIG. 2A, the modified CFG of FIG. 6 may be obtained (prior to separation into stages) when blocks 51 and 52 of FIG. 5 are applied.

Continuing with the procedure of FIG. 5, blocks 53 and 54 together may be considered to form a second component of the procedure, which may be used to compute a correct interference relationship between live objects over the concatenated CFG of the stages, without impossible paths (as discussed in connection with FIG. 4, above). In block 53, an interference relationship may be determined between the various newly-defined objects (e.g., u' and v') for the live objects (e.g., u and v). If it is determined that two newly-defined objects interfere, then their corresponding live objects may also be determined to interfere in a final interference graph (to be discussed further below). In block 54, if there is a path from a use of one newly-defined object (e.g., v') to a definition of another newly-defined object (e.g., u'), then the corresponding live objects (e.g., u and v) may be determined to interfere in the final interference graph.

Figure 7A:
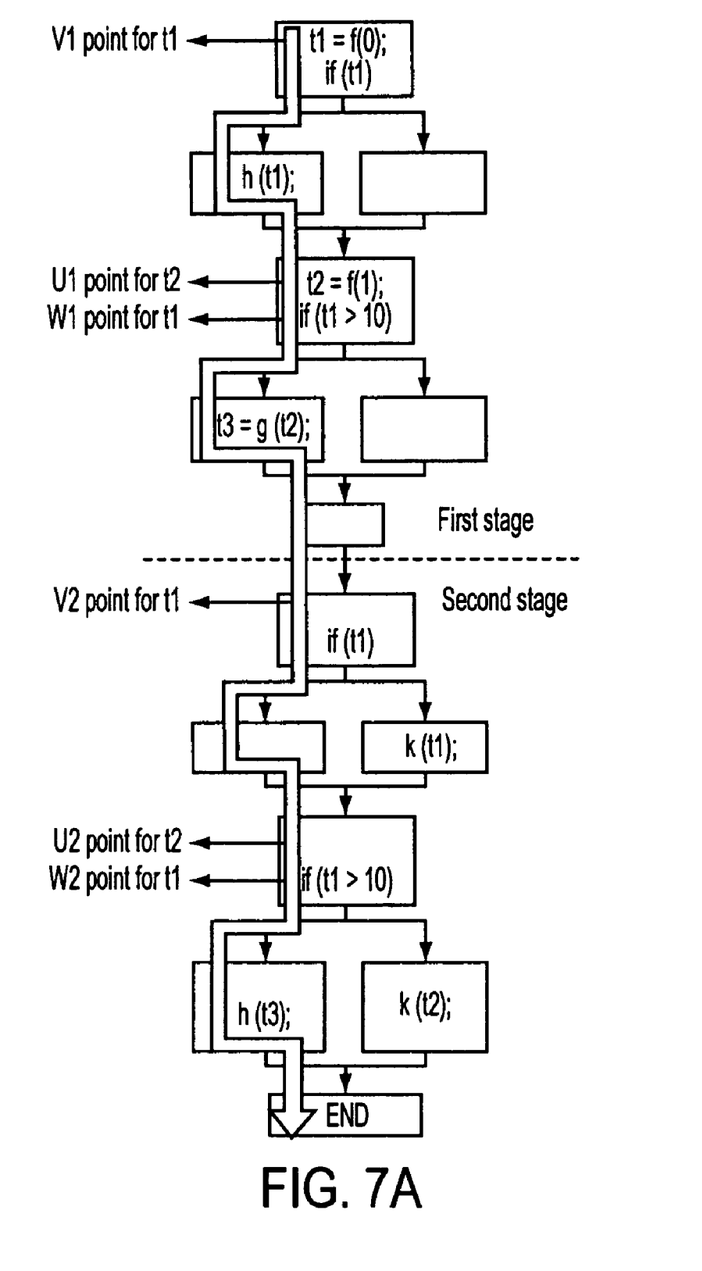
FIGS. 7A and 7B show concatenated control flow graphs demonstrating interference according to some embodiments of the invention.
Figure 7B:
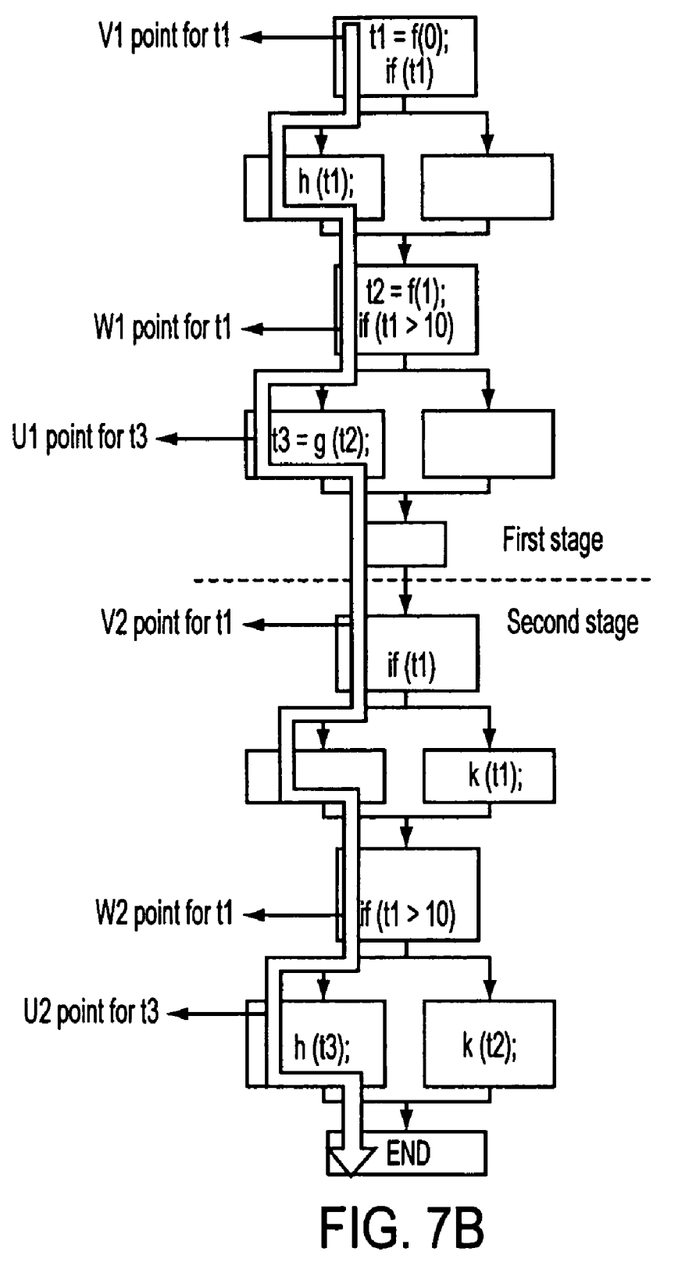

The procedure of blocks 53 and 54 may be illustrated via the concatenated CFGs shown in FIGS. 7A and 7B. FIGS. 7A and 7B correspond to the example of FIG. 2B (and FIG. 4). In FIGS. 7A and 7B, the points U1, V1, U2, V2, W1, and W2 may be defined as follows:

| Name | Definition |
|---|---|
| V1 | Definition point of a first variable (e.g., v) in the first stage. |
| U1 | Definition point of a second variable (e.g., u) in the first stage. |
| V2 | Point in the second stage that corresponds to V1 point of the first stage. |
| U2 | Point in the second stage that corresponds to U1 point of the first stage. |
| W2 | A use of the first variable (e.g., v) in the second stage. |
| W1 | Point in first stage that corresponds to W2 point of the second stage. |

These definitions may provide a basis by which to analyze the interference of two quantities (e.g., v and u). Note that W2 (and, accordingly, W1) may be moved from one use of the first variable (e.g., v) in the second stage to another as the procedure continues with determining whether the two quantities interfere (that is, all uses may be considered). Also note that, while these definitions are given for the example of a two-stage partition (i.e., as in the example of FIGS. 7A and 7B), they may be generalized for partitions of more than two stages. For the purpose of determining whether or not there is interference between two quantities, v and u, it may be shown that v and u will interfere if and only if the order in which the above-defined points occur satisfies one of two conditions: (1) V1->U1->W1->V2->U2->W2; or (2) V1->W1->U1->V2->W2->U2.

Suppose, in the example of FIG. 2B (and FIG. 4), that the quantities t1 and t2 are considered to determine if they interfere with each other. This is the example illustrated in FIG. 7A. In this case, one may let V1 correspond to the point at which t1 is defined in the first stage and U1 correspond to the point at which t2 is defined in the first stage. Moving to the second stage, then, the corresponding points may be marked by V2 and U2, respectively. Then, W2 may, for example, be placed as shown, and the corresponding point in the first stage may be marked by W1. In this case, the six points follow the order V1->U1->W1->V2->U2->W2, and thus, t1 and t2 interfere.

Now, in the same example, consider the quantities t1 and t3, which is illustrated in FIG. 7B. Again, V1 may correspond to the point at which t1 is defined in the first stage, and U1 may correspond to the point at which t3 is defined in the first stage. The remaining points (V2, U2, W2, and W1) may be placed in the same manner as before. The resulting order of these points is V1->W1->U1->V2->W2->U2, and as a result, t1 and t3 interfere.

Returning to FIG. 5, blocks 55-57 may be considered as forming a third component of the procedure. As a result of the determinations made in blocks 53 and 54, an interference graph may be formed. In this interference graph, each node of the graph may represent one of the variables (e.g., t1, t2, and t3), and edges may be provided between nodes if the corresponding variables have been determined to interfere with each other. In block 55, the interference graph may be colored, using any known or as yet to be discovered graph coloring algorithm.

In block 56, the colored interference graph may be considered. For each live object v, if it is colored using a color k, a new instruction defining $v_k$ may be inserted immediately following the definition point of v in the CFG of the first stage (or the first stage in which v is defined). Then, at the end of the stage, all the $v_k$ defined for that stage may be transmitted to the pipe.

Block 57 may then be used to examine one or more subsequent stages. For each live object v colored with a color k, in the subsequent stage, each use of v may be changed to a use of $v_k$ in that (subsequent) stage. All of the $v_k$ may be received from the pipe at the beginning of each (subsequent) stage.

Figure 8:
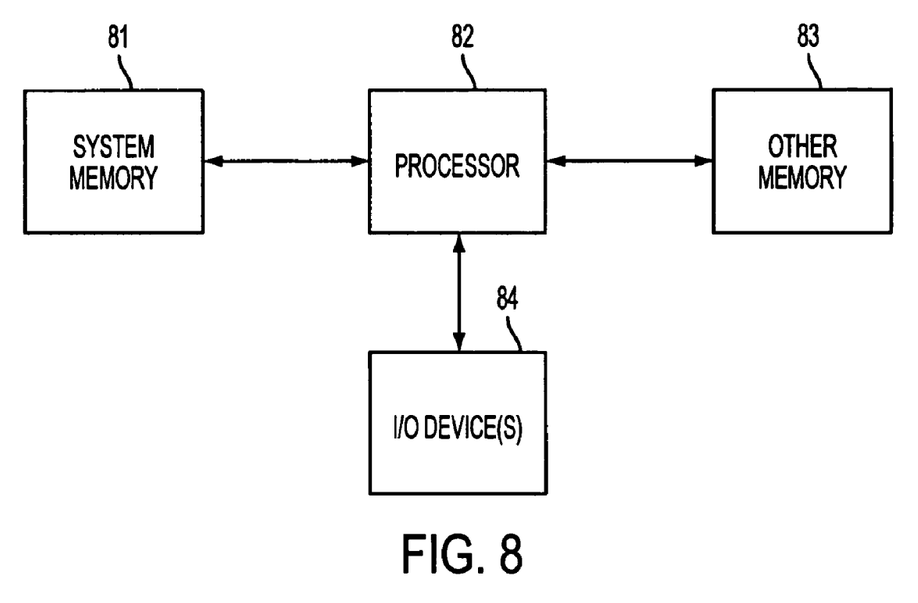
FIG. 8 depicts a conceptual block diagram of a system for implementing some embodiments of the invention.

Some embodiments of the invention, as discussed above, may be embodied in the form of software instructions on a machine-accessible medium. Such an embodiment is illustrated in FIG. 8. The computer system of FIG. 8 may include at least one processor 82, with associated system memory 81, which may store, for example, operating system software and the like. The system may further include additional memory 83, which may, for example, include software instructions to perform various applications. System memory 81 and additional memory 83 may comprise separate memory devices, a single shared memory device, or a combination of separate and shared memory devices. The system may also include one or more input/output (I/O) devices 84, for example (but not limited to), keyboard, mouse, trackball, printer, display, network connection, etc. The present invention may be embodied as software instructions that may be stored in system memory 81 or in additional memory 83. Such software instructions may also be stored in removable or remote media (for example, but not limited to, compact disks, floppy disks, etc.), which may be read through an I/O device 84 (for example, but not limited to, a floppy disk drive). Furthermore, the software instructions may also be transmitted to the computer system via an I/O device 84, for example, a network connection; in such a case, a signal containing the software instructions may be considered to be a machine-accessible medium.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed as new and desired to be protected by Letters Patent of the United States is:

1. A method comprising:
   identifying with a computer, live data in a previous stage required by a subsequent stage of a partitioned program stored in a machine-accessible medium, wherein at least one of said stages comprises more than one thread, and wherein said live data comprises data defined in said previous stage used in said subsequent stage; and
   providing for transmission of said required live data between consecutive stages of said partitioned program.

2. The method according to claim 1, wherein said providing for transmission comprises:
   putting each piece of required live data into a pipe following a point immediately following its definition in said previous stage in which it is defined; and
   getting from said pipe each piece of live data required by said subsequent stage at a point in said subsequent stage that immediately precedes the use of the piece of required live data put into the pipe.

3. The method according to claim 1, wherein said providing for transmission comprises:
   placing into a pipe, at an end of said previous stage, said live data required for said subsequent stage of said program; and
   getting from said pipe, at a beginning of said subsequent stage, said live data required for that stage and defined in said previous stage.

4. The method according to claim 1, wherein said identifying live data required comprises:
   determining required live data in said previous stage based on conditional statements in said subsequent stage of said program.

5. The method according to claim 1, wherein said identifying live data required comprises:
   rendering said program such that definitions of live data in one or more stages in which they are initially defined and their uses in subsequent stages are made explicit by introducing an alternative representation of each piece of live data following its definition and substituting said alternative representation for each subsequent occurrence of said piece of live data in said subsequent stages of said program.

6. The method according to claim 5, wherein said identifying live data required further comprises:
   making one or more pairwise determinations as to whether pieces of live data interfere.

7. The method according to claim 6, wherein said making one or more pairwise determinations comprises:
   determining that two pieces of live data interfere if a path taken through the program, considering all stages, from a use of a first piece of live data leads to a definition of a second piece of live data.

8. The method according to claim 6, wherein said identifying live data required further comprises:
   forming an interference graph; and
   applying a graph coloring algorithm to said interference graph to obtain a colored interference graph.

9. The method according to claim 8, wherein said identifying live data required further comprises:
   inserting, for each piece of live data in said colored interference graph having a particular color, a definition of a new piece of data, said definition being inserted immediately following an initial definition of the piece of live data; and
   substituting the new piece of data for each occurrence in the program of said piece of live data subsequent to said definition of the new piece of data.

10. A machine-accessible medium containing instructions that, when executed by a computing platform, cause said computing platform to perform a method comprising: identifying with a computer, live data required by a subsequent stage of a partitioned program stored in a machine-accessible medium, wherein at least one of said stages comprises more than one thread, and wherein said live data comprises data defined in a previous stage used in a subsequent stage; and
    providing for transmission of said required live data between consecutive stages of said partitioned program.

11. The machine-accessible medium according to claim 10, wherein said providing for transmission comprises:
    putting each piece of required live data into a pipe following a point immediately following its definition in said previous stage in which it is defined; and
    getting from said pipe each piece of live data required by said subsequent stage at a point in the subsequent stage that immediately precedes the use of the piece of required live data put into the pipe.

12. The machine-accessible medium according to claim 10, wherein said providing for transmission comprises:
    placing into a pipe, at an end of said previous stage, said live data required for said subsequent stage of said program; and
    getting from said pipe, at a beginning of said subsequent stage, said live data required for that stage and defined in said previous stage.

13. The machine-accessible medium according to claim 10, wherein said identifying live data required comprises:
    determining required live data in said previous stage based on conditional statements in said subsequent stage of said program.

14. The machine-accessible medium according to claim 10, wherein said identifying live data required comprises:
    rendering said program such that definitions of live data in one or more stages in which they are initially defined and their uses in subsequent stages are made explicit by introducing an alternative representation of each piece of live data following its definition and substituting said alternative representation for each subsequent occurrence of said piece of live data in said subsequent stages of said program.

15. The machine-accessible medium according to claim 14, wherein said identifying live data required further comprises:
    making one or more pairwise determinations as to whether pieces of live data interfere.

16. The machine-accessible medium according to claim 15, wherein said making one or more pairwise determinations comprises:
    determining that two pieces of live data interfere if a path taken through the program, considering all stages, from a use of a first piece of live data leads to a definition of a second piece of live data.

17. The machine-accessible medium according to claim 15, wherein said identifying live data required further comprises:
    forming an interference graph; and
    applying a graph coloring algorithm to said interference graph to obtain a colored interference graph.

18. The machine-accessible medium according to claim 17, wherein said identifying live data required further comprises:

inserting, for each piece of live data in said colored interference graph having a particular color, a definition of a new piece of data, said definition being inserted immediately following an initial definition of the piece of live data; and substituting the new piece of data for each occurrence in the program of said piece of live data subsequent to said definition of the new piece of data.

19. An apparatus comprising:

at least two processing platforms, each of said processing platforms comprising more than one processor, each processing platform adapted to execute a stage of a partitioned program, and different ones of said processors of said processing platform adapted to execute a different parallel thread of said stage of said partitioned program; and at least one data transmission path linking at least two of said processing platforms, wherein at least one piece of identified live data required by at least one subsequent stage of said partitioned program is transmitted through at least one said data transmission path, wherein live data comprises data defined in a previous stage used in said subsequent stage.

20. The apparatus according to claim 19, further comprising:

a processor adapted to determine which pieces of live data are required to be transmitted through at least one said data transmission path.

21. The apparatus according to claim 20, wherein said processor adapted to determine is adapted to determine which pieces of data are required to be transmitted through at least one said data transmission path by analyzing whether pieces of live data interfere with each other.

22. The apparatus according to claim 19, further comprising:

at least one memory coupled to at least one of said processing platforms.

* * * * *